United States Patent
Starsinic et al.

(10) Patent No.: US 11,736,968 B2
(45) Date of Patent: Aug. 22, 2023

(54) CAPILLARY DEVICE CHARGING

(71) Applicant: InterDigital Patent Holdings, Inc., Wilmington, DE (US)

(72) Inventors: Michael F. Starsinic, Newtown, PA (US); Suresh Palanisamy, Namakkal District (IN); Zongrui Ding, Portland, OR (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 96 days.

(21) Appl. No.: 17/024,898

(22) Filed: Sep. 18, 2020

(65) Prior Publication Data

US 2021/0007001 A1    Jan. 7, 2021

Related U.S. Application Data

(63) Continuation of application No. 14/335,096, filed on Jul. 18, 2014, now Pat. No. 10,813,002.

(Continued)

(51) Int. Cl.
*H04L 12/14*    (2006.01)
*H04W 4/24*    (2018.01)
(Continued)

(52) U.S. Cl.
CPC ..... *H04W 28/0215* (2013.01); *H04L 12/1403* (2013.01); *H04L 12/1475* (2013.01);
(Continued)

(58) Field of Classification Search
CPC ..... H04W 4/24; H04W 4/70; H04W 28/0215; H04W 88/04; H04L 12/1403;
(Continued)

(56) References Cited

U.S. PATENT DOCUMENTS

2006/0031515 A1* 2/2006 Van Gassel ........... H04W 88/04
709/227
2008/0098105 A1    4/2008 Okada
(Continued)

FOREIGN PATENT DOCUMENTS

CN    101277193 A    10/2008
CN    102265580 A    11/2011
(Continued)

OTHER PUBLICATIONS

3rd Generation Partnership Project (3GPP), TS 21.905, V3.0.0, 3rd Generation Partnership; Technical Specification Group Services and System Aspects; Vocabulary for 3GPP Specifications (Release 12), Jun. 2013, 64 pages.
(Continued)

*Primary Examiner* — Hoon J Chung
(74) *Attorney, Agent, or Firm* — BakerHostetler

(57) ABSTRACT

The present application describes a user equipment including a processor and a memory, where the memory stores computer-executable instructions that, when executed by the processor, cause the user equipment to perform a set of instructions. The instructions include transmitting, to a network, a message requesting to modify or establish flow that is not to be charged to the user equipment. The instructions also include receiving, from the network, an indication based on the message request. The instructions further include determining, based on the indication, whether to make the flow being associated with the message.

20 Claims, 9 Drawing Sheets

Related U.S. Application Data

(60) Provisional application No. 61/847,671, filed on Jul. 18, 2013.

(51) Int. Cl.
*H04W 88/04* (2009.01)
*H04W 28/02* (2009.01)
*H04W 4/70* (2018.01)
*H04L 67/147* (2022.01)
*H04M 15/00* (2006.01)

(52) U.S. Cl.
CPC ........ *H04L 12/1496* (2013.01); *H04L 67/147* (2013.01); *H04M 15/09* (2013.01); *H04M 15/60* (2013.01); *H04M 15/8083* (2013.01); *H04W 4/24* (2013.01); *H04W 4/70* (2018.02); *H04W 88/04* (2013.01)

(58) Field of Classification Search
CPC ............. H04L 12/1475; H04L 12/1496; H04L 67/147; H04M 15/09; H04M 15/60; H04M 15/8083
See application file for complete search history.

(56) References Cited

U.S. PATENT DOCUMENTS

| | | |
|---|---|---|
| 2011/0035495 A1 | 2/2011 | Hannes et al. |
| 2011/0122885 A1 | 5/2011 | Hedman et al. |
| 2012/0069805 A1 | 3/2012 | Feuersanger et al. |
| 2012/0093167 A1 | 4/2012 | Rajesh et al. |
| 2012/0224552 A1 | 9/2012 | Feuersanger et al. |
| 2012/0264375 A1 | 10/2012 | Shankaranarayanan |
| 2013/0070596 A1* | 3/2013 | Yeh ..................... H04W 76/22 370/235 |
| 2013/0102277 A1 | 4/2013 | Stenfelt et al. |
| 2013/0231083 A1 | 9/2013 | Keren |
| 2013/0294327 A1 | 11/2013 | Horn et al. |
| 2013/0316674 A1 | 11/2013 | Cho et al. |
| 2014/0071882 A1 | 3/2014 | Abraham et al. |
| 2015/0011180 A1 | 1/2015 | Buonomo et al. |
| 2015/0044989 A1 | 2/2015 | De et al. |

FOREIGN PATENT DOCUMENTS

| | | |
|---|---|---|
| EP | 1339200 A2 | 8/2003 |
| EP | 1339210 A1 | 8/2003 |
| EP | 2421028 A1 | 2/2012 |
| JP | 11-313172 A | 11/1999 |
| JP | 2006-505987 A | 2/2006 |
| JP | 2006-217065 A | 8/2006 |
| JP | 2006-353042 A | 12/2006 |
| JP | 2007-336090 A | 12/2007 |
| JP | 2009-246420 A | 10/2009 |
| JP | 2012-523146 | 9/2012 |
| JP | 2013-509759 | 3/2013 |
| JP | 2013-511871 | 4/2013 |
| JP | 2014-505438 A | 2/2014 |
| JP | 2015-501094 A | 1/2015 |
| KR | 10-2005-0067429 A | 7/2005 |
| KR | 10-2008-0103549 A | 11/2008 |
| KR | 10-2012-0000578 A | 1/2012 |
| WO | 2004/043008 A1 | 5/2004 |
| WO | 2006/098037 A1 | 9/2006 |
| WO | 2007/087828 A1 | 8/2007 |
| WO | 2010/077391 A1 | 7/2010 |
| WO | 2011/039985 A1 | 4/2011 |
| WO | 2012/001512 A2 | 1/2012 |
| WO | 2012/001513 A2 | 1/2012 |
| WO | 2012/052067 A1 | 4/2012 |
| WO | 2012/075323 A1 | 6/2012 |
| WO | 2012/102594 A2 | 8/2012 |
| WO | 2013/053896 A1 | 4/2013 |
| WO | 2014/079033 A1 | 5/2014 |
| WO | 2015/010023 A1 | 1/2015 |

OTHER PUBLICATIONS

3rd Generation Partnership Project (3GPP), TS 23.003, V11.5.0, 3rd Generation Partnership; Technical Specification Group Core Network and Terminals; Numbering, addressing and identification (Release 11), Mar. 2013, 83 pages.
3rd Generation Partnership Project (3GPP), TS 23.203, V12.1 0, 3rd Generation Partnership; Technical Specification Group Services and System Aspects; Policy and Charging Control Architecture (Release 12), Jun. 2013, 189 pages.
3rd Generation Partnership Project (3GPP), TS 23.401, V12.1.0, 3rd Generation Partnership; Technical Specification Group Services and System Aspects; General Packet Radio Service (GPRS) enhancements for Evolved Universal Terrestrial Radio Access Network (E-UTRAN) access (Release 12), Jun. 2013, 291 pages.
3rd Generation Partnership Project (3GPP), TS 23.402, V12.1.0, 3rd Generation Partnership; Technical Specification Group Services and System Aspects; Architecture enhancements for non-3GPP accesses (Release 12), Jun. 2013, 254 pages.
3rd Generation Partnership Project (3GPP), TS 24.008, V12.2.0, 3rd Generation Partnership; Technical Specification Group Core Network and Terminals; Mobile radio interface Layer 3 specification; Core network protocols; Stage 3 (Release 12), Jun. 2013, 682 pages.
3rd Generation Partnership Project (3GPP), TS 24.301, V12.1.0, 3rd Generation Partnership; Technical Specification Group Core Network and Terminals; Non-Access-Stratum (NAS) protocol for Evolved Packet System (EPS); Stage 3 (Release 12), Jun. 2013, 350 pages.
3rd Generation Partnership Project (3GPP), TS 29.210, V6.7.0, 3rd Generation Partnership; Technical Specification Group Core Network and Terminals; Charging rule provisioning over Gx interface (Release 6), Dec. 2006, 21 pages.
3rd Generation Partnership Project (3GPP), TS 29.212, V12.1.0, 3rd Generation Partnership; Technical Specification Group Core Network and Terminals; Policy and Charging Control (PCC); Reference points (Release 12), Jun. 2013, 200 pages.
3rd Generation Partnership Project (3GPP), TS 29.273, V12.0.0, 3rd Generation Partnership; Technical Specification Group Core Network and Terminals; Evolved Packet System (EPS); 3GPP EPS AAA interfaces (Release 12), Jun. 2013, 136 pages.
3rd Generation Partnership Project (3GPP), TS 33.402, V12.0.0, 3rd Generation Partnership; Technical Specification Group Services and System Aspects; 3GPP System Architecture Evolution (SAE); Security aspects of non-3GPP accesses (Release 12), Jun. 2013, 55 pages.
International Patent Application No. PCT/US2014/047201: International Search Report dated Dec. 22, 2014, 10 pages.
Japanese Patent Application No. 2016-527127: Notice of Reasons for Rejection dated Feb. 7, 2017, 6 pages.
Korean Application No. 2017-039555999: Notice of Allowance dated Jun. 5, 2017, 2 pages.
Xia et al., Machine translation of WO2014/079033 A1, May 30, 2014, machine translation retrieved on Jun. 9, 2020, 22 pages. (Year: 2014).

* cited by examiner

Interface — 502

Use High Data Rate Service
○ Always Allow
● Allow If Sponsored

Third Party Connections
○ Always Allow
● Allow If Sponsored

High Data Usage Connections
Games
● Always Allow
○ Allow If Sponsored
Media
○ Always Allow
● Allow If Sponsored

FIG. 5

CAPILLARY DEVICE CHARGING

CROSS REFERENCE TO RELATED APPLICATIONS

This application is a continuation of U.S. patent application Ser. No. 14/335,096 filed Jul. 18, 2014 which claims the benefit of, and incorporates herein by reference, U.S. Provisional Patent Application No. 61/847,671, filed Jul. 18, 2013.

BACKGROUND

Machine-to-machine (M2M) technologies allow devices to communicate more directly with each other using wired and wireless communications systems. M2M technologies enable further realization of the Internet of Things (IoT), a system of uniquely identifiable objects and virtual representations of such objects that communicate over a network, such as the Internet. IoT may facilitate communication with even mundane everyday objects, such as products in a grocery store, and thereby reduce costs and waste by improving knowledge of such objects. For example, stores may maintain very precise inventory data by being able to communicate with, or obtain data from, objects that may be in inventory or may have been sold.

A capillary network, from the perspective of a user or user device, is a link to the Internet regardless of the type of link. For engineers and operators of such networks, a capillary network represents all the different possible paths a user device may use to access a network that can provide access to the Internet. Accordingly, devices that access the Internet using a capillary network are capillary network devices.

The 3rd Generation Partnership Project (3GPP) unites a number of telecommunications standard development organizations and provides their members with an environment in which to develop specifications for cellular telecommunications network technologies, including radio access, the core transport network, and service capabilities. 3GPP specifications also provide hooks for non-radio access to the core network, and for interworking with other networks.

The latest evolution of the 3GPP core network architecture for wireless communications is referred to as the Evolved Packet Core (EPC). EPC was first introduced by 3GPP in Release 8 of the standard. It was designed to have a "flat architecture" in order to handle data traffic efficiently from a performance and cost perspective, and few network nodes are involved in the handling of traffic. Protocol conversion is also generally avoided. It was also decided to separate the user data (also known as the "user plane") from the signaling (also known as the "control plane"), which enables network operators to dimension and adapt their networks easily.

SUMMARY

One aspect of the application describes a user equipment including a processor and a memory, where the memory stores computer-executable instructions that, when executed by the processor, cause the user equipment to perform a set of instructions. The instructions include transmitting, to a network, a message requesting to modify or establish flow that is not to be charged to the user equipment. The instructions also include receiving, from the network, an indication based on the message request. The instructions further include determining, based on the indication, whether to make the flow being associated with the message.

Another aspect of the application describes a network device comprising a processor and a memory. The memory stores computer-executable instructions that, when executed by the processor, cause the network device to perform a set of instructions. The instructions include receiving, from a user equipment, a message requesting to modify or establish flow that is not to be charged to the user equipment. The instructions also include transmitting, to the user equipment, an indication based on the message request. The user equipment is configured to determine, based on the indication, whether to make the flow being associated with the message.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

FIG. 5 is a diagram that illustrates an exemplary interface that can be used with embodiments.

DETAILED DESCRIPTION OF ILLUSTRATIVE EMBODIMENTS

Figure 1:
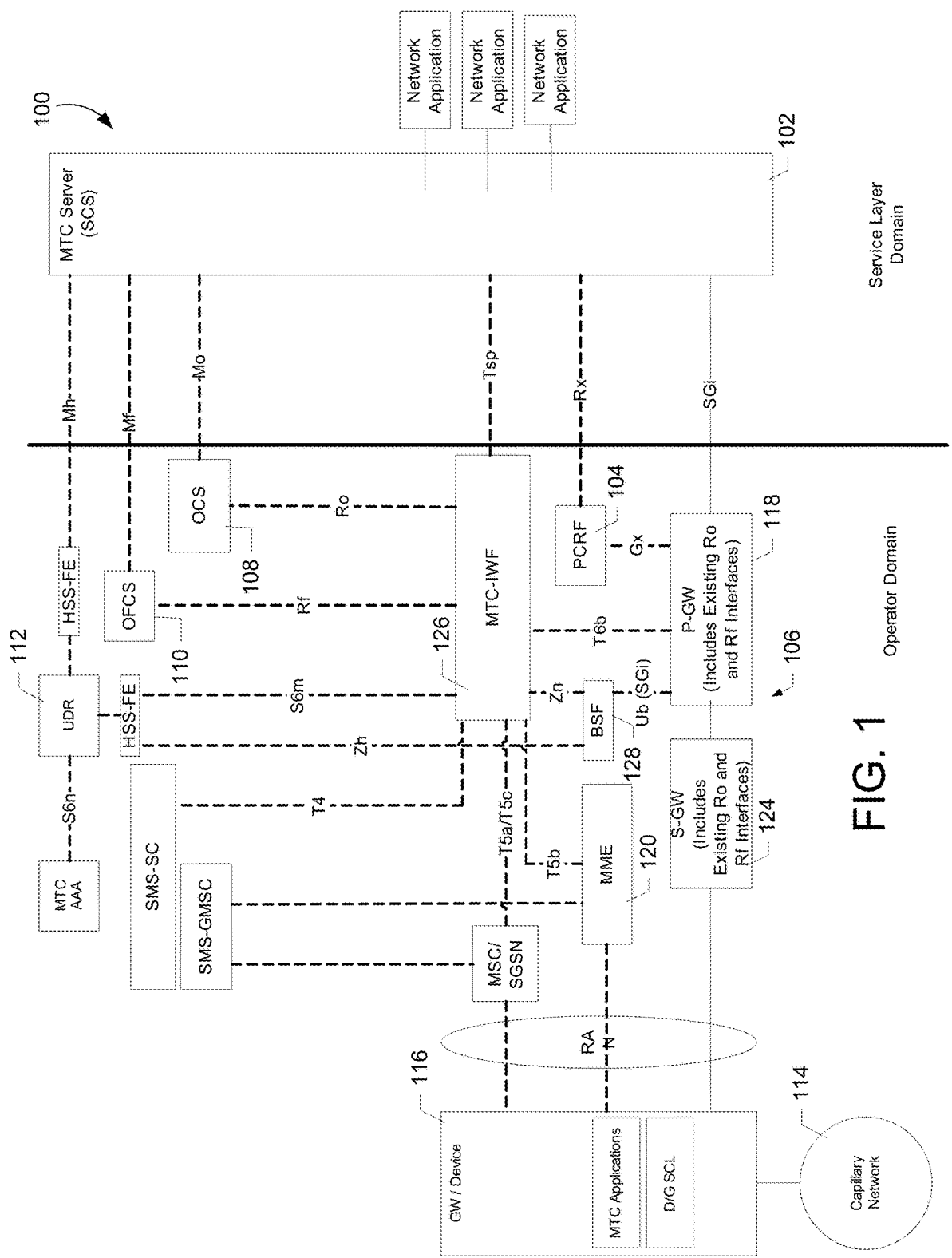
FIG. 1 is a block diagram of exemplary, non-limiting system with a Services Capability Server (SCS).

FIG. 1 is a block diagram of exemplary, non-limiting system 100 where a Services Capability Server (SCS) 102 may have a business relationship with a Mobile Network Operator (MNO) 106 that may be an owner of an Evolved Packet Core (EPC). The business relationship may allow the SCS 102 and MNO 106 to interface over several reference points that effectively integrate the SCS 102 with the EPC. In FIG. 1, the SGi interface represents standard internet traffic. The Rx interface allows the SCS 102 to provide a Policy and Charging Rules Function (PCRF) 104 with information about data flows. For example, the SCS 102 can indicate to the PCRF 104 that a particular data flow requires a certain level of Quality of Service (QoS). The SCS 102 may also use the Rx interface to indicate to the PCRF 104 that it wishes to sponsor a particular flow. Sponsoring a flow can mean that the traffic associated with the flow will not be charged to the end user device (e.g., user equipment (UE)). For example, the flow can be charged to the SCS 102.

The device 116 can be user equipment (UE), a gateway or a UE acting as a gateway. The device 116 can connect to a capillary network 114, or operate on its own. A UE may comprise any wireless device capable of communicating in a 3GPP or other wireless network, such as an M2M or MTC device or gateway, including for example, machines, sensors, appliances, or the like, a mobile station, a fixed or mobile subscriber unit, a pager, a personal digital assistant (PDA), a computer, a mobile phone or smart phone, or any other type of device capable of operating in a wired or wireless environment. An example architecture of a UE 402 is described below in connection with FIG. 6C. Other elements of FIG. 1 including SCS 102 network applications, mobile core network, and related logical entities may be implemented on a computing system or server, such as the example computing system or server described below in connection with FIG. 6D.

Functionality at device 116, MTC server 102, network applications, capillary devices and the mobile core network may also be implemented as a logical entity (e.g., software) executing either on a standalone node or server or as part of an existing node or server.

The Mo interface in FIG. 1 allows the SCS 102 to interface to the MNO's Online Charging System (OCS) 108. The Mf interface allows the SCS 102 to interface to the MNO's Offline Charging System (OFCS) 110. The Tsp interface allows the SCS 102 to send triggers towards devices. The Mh interface allows the SCS 102 to access the MNO's User Data Repository (UDR) 112. The UDR 112 may be a centralized entity that may contains all subscriber information. It may essentially serve as a replacement for a Home Subscriber Server (HSS), a Home Location Register (HLR), and/or a Subscription Profile Repository (SPR).

The gateways (Serving GW 124 and PDN GW 118) deal with the user plane. They transport IP data traffic between the User Equipment (UE) and the external networks. The Serving GW 124 is the point of interconnect between the radio-side and the EPC. As its name indicates, this gateway serves the UE by routing incoming and outgoing IP packets. It is the anchor point for intra-LTE mobility (i.e. in case of handover between eNodeBs) and between LTE and other 3GPP accesses. It is logically connected to the other gateway, the PDN GW 118.

The PDN GW 118 is the point of interconnect between the EPC and external IP networks, such as the Internet. These networks are called PDN (Packet Data Network), hence the name. The PDN GW 118 routes packets to and from the PDNs. The PDN GW 118 also performs various functions such as IP address/IP prefix allocation or policy control and charging. 3GPP specifies these gateways independently but in practice they may be combined in a single "box" by network vendors.

The MME (for Mobility Management Entity) 120 deals with the control plane. It handles the signaling related to mobility and security for E-UTRAN access. The MME 120 is responsible for the tracking and the paging of User Equipment (UE) in idle-mode. It is also the termination point of the Non-Access Stratum (NAS).

MTC Interworking Function (MTC-IWF) 126 supports the SCS (Service Capability Server) 102 and authorizes control plane requests from SCS 102. MTC-IWF 126 also delivers the messages from SCS 102 to MTC devices.

A Bootstrapping Server Function (BSF) 128 is an intermediary element in cellular networks which provides application independent functions for mutual authentication of user equipment and servers unknown to each other and for 'bootstrapping' the exchange of secret session keys afterwards.

Figure 2:
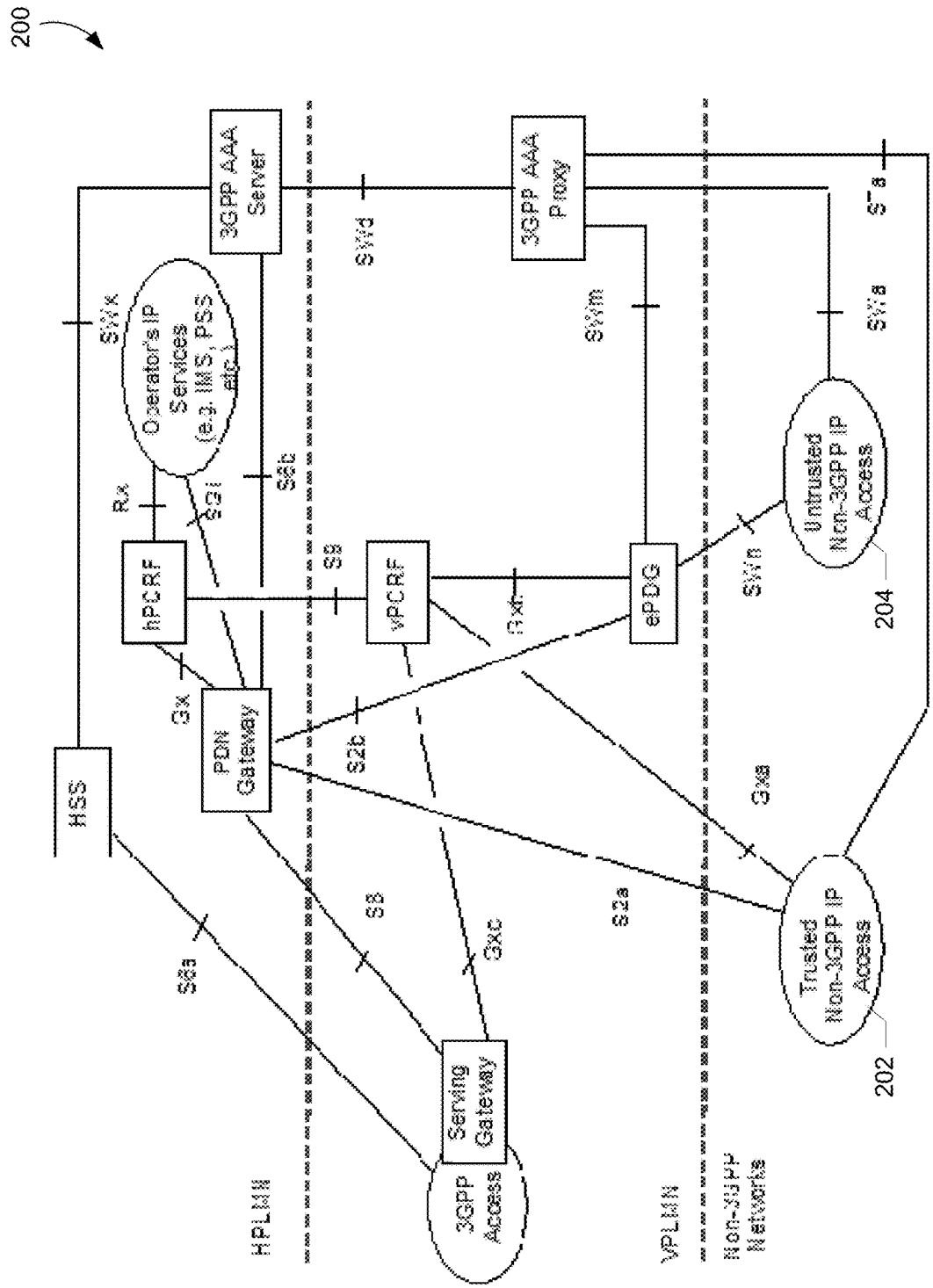
FIG. 2 is a diagram that illustrates exemplary, non-limiting architecture, including trusted non-3GPP access points and untrusted non-3GPP access points that may allow a UE to access the EPC using non-cellular technologies.

FIG. 2 is a diagram that illustrates exemplary, non-limiting architecture 200, including trusted non-3GPP access points 202 and untrusted non-3GPP access points 204 that may allow a UE to access the EPC using non-cellular technologies. Any device that uses these access points to access the EPC may be required to have a Subscriber Identity Module (SIM). However, it may be difficult to determine an appropriate charging scheme when capillary network devices that have no relationship with an MNO or a 3GPP GW connect to the EPC, such as when, for example, non-cellular capillary network devices, which have no relationship with a 3GPP GW or an MNO, attempt to connect to an application server (AS), such as an SCS, via a 3GPP GW.

Figure 3:
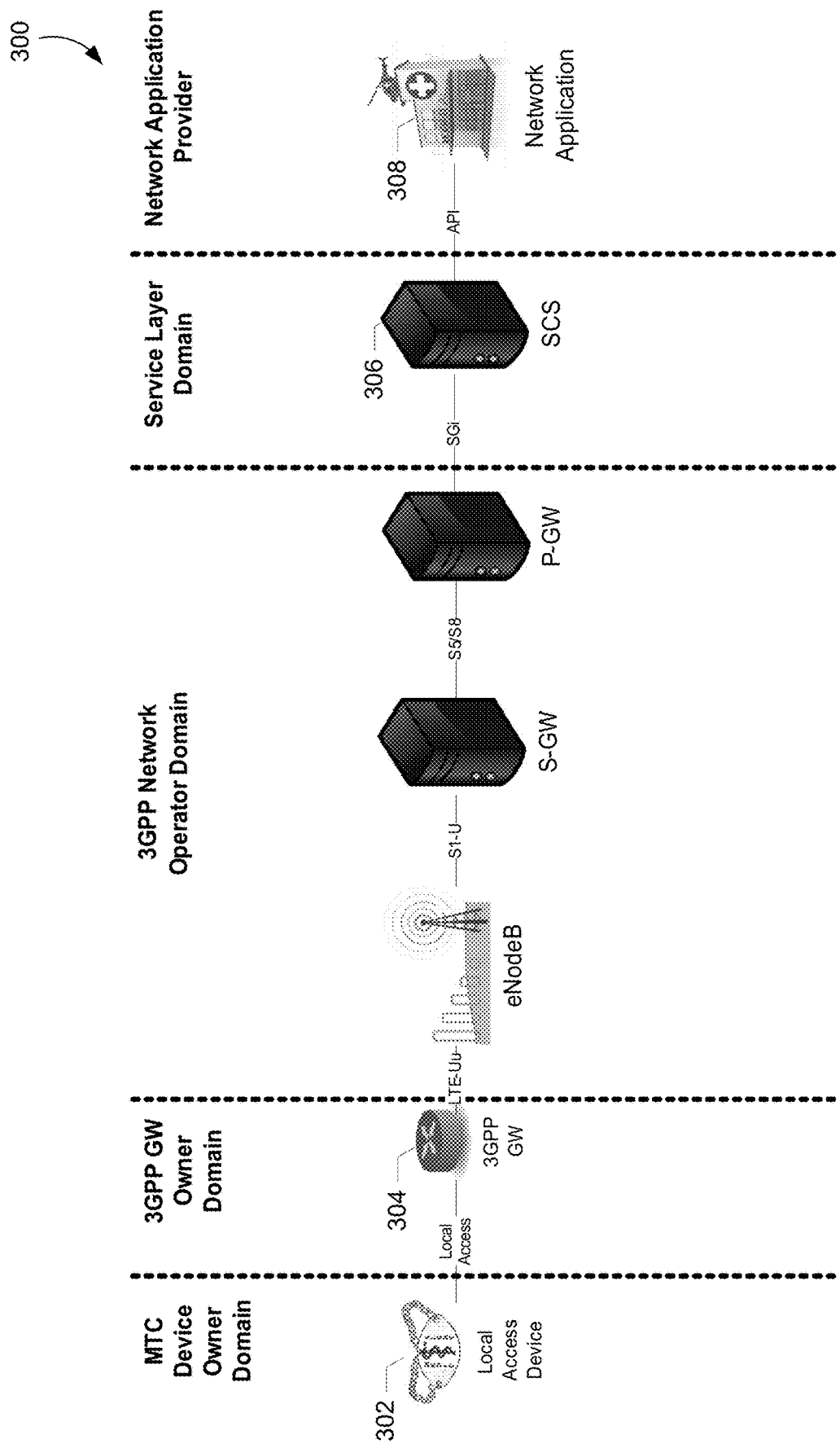
FIG. 3 is a diagram of an exemplary, non-limiting implementation with a non-cellular medical device and an M2M gateway.

For example, as illustrated in FIG. 3 with exemplary, non-limiting implementation 300, when a person fitted with a non-cellular medical device 302 roams into an area that is served by an M2M gateway (e.g., a 3GPP GW 304), the medical device and the 3GPP GW 304 may communicate using IEEE 802.15.4, Bluetooth, or some other local wireless or wired access technology. The 3GPP GW 304 and medical device 302 may not have any pre-existing relationship and the medical device may not have a relationship with the network operator. However, the medical device may wish to use the 3GPP GW 304 to access a network application (e.g., an SCS 306) so that it can report some diagnostic information. The devices of implementation 300 may have business relationships such as those illustrated in Table 1. Problems that may be solved by the disclosed embodiments include how to allow the medical device in FIG. 3, and similar devices, access to a network application, how to compensate the 3GPP GW 304 owner, and where the 3GPP GW 304 owner is not to be compensated, how to indicate to the 3GPP GW 304 owner that there will be no charge and to compensate the network operator. If the 3GPP GW 304 is not provided with some indication or assurance that its owner will receive compensation or at least not be charged, then the 3GPP GW 304 should not be expected to provide access to this device. Note that the capillary network devices used as examples herein, or used in any embodiment, may be cellular capable but in most embodiments the device's cellular radio is not in use for acquiring the described service.

TABLE 1

Exemplary Third Party Capillary Network Device Use Case - Relationship Definition

| | Capillary Network Device | 3GPP GW | MNO | SCS | Network Application |
|---|---|---|---|---|---|
| Capillary Network Device | N/A | No Relationship | No Relationship | Relationship | Relationship |
| 3GPP GW | No Relationship | N/A | Relationship | No Relationship | No Relationship |
| MNO | No Relationship | Relationship | N/A | Relationship | No Relationship |
| SCS | Relationship | No Relationship | Relationship | N/A | Relationship |
| Network Application | Relationship | No Relationship | No Relationship | Relationship | N/A |

In an embodiment, when a capillary network device 302 connects to a 3GPP GW 304 (e.g., a UE functioning as a GW (UE/GW)) the GW 304 may establish and/or modify a bearer to support traffic from the capillary device. A UE/GW 304 may request that the network provide some indication that the UE/GW 304 will not be charged for the traffic. In some embodiments, the network may indicate to the UE/GW 304 that the flow to be used by the capillary network device is sponsored (e.g., will be paid for by another entity). To accomplish this, in an embodiment existing messages between the UE/GW 304, P-GW 306, PCRF 104, and/or AS (SCS 308) may be modified so that the UE/GW 304 may request a guarantee of sponsorship and so that the AS (SCS 308) may indicate to the UE/GW 304 that the flow is sponsored.

Sponsored services may allow service providers (e.g., an AS or an SCS) to indicate to the PCRF when IP flows are sponsored. This indication may be sent to the PCRF via the Rx interface (Diameter). Sponsored flows will not be charged to the user. Instead, they will be charged to the service provider. While sponsored flows do not appear in a user's bill, the user's UE may otherwise not be aware of sponsored connectivity.

Alternately, the user equipment can send messages checking if a flow is to be sponsored or compensated on behalf of itself rather than on behalf of a capillary device.

Note that in FIG. 1, the SCS 102 is shown connecting to the PCRF 104 via the Rx reference point. Although the 3GPP specifications do not explicitly show the SCS 102 connected to the Rx reference point, it may be so connected. The Rx reference point was created specifically to allow an AS owned by MNO or a 3rd party application provider (see, e.g., 3GPP TS 23.862) to connect to the PCRF to configure data flows for QoS and sponsorship. The SCS 102 may be an AS in this scenario. In order to support embodiments where a third party capillary network device 114 may attempt to connect an SCS 102, a UE/GW 116 may indicate to the Core Network when a service data flow belongs to a third party device. A UE/GW 116 may also indicate to the Core Network that the UE/GW 116 only wishes to allow the service data flow if it is sponsored (i.e., if there will be no charge to the UE/GW 116) or if the UE/GW 116 is compensated for providing the accessing service to the service provider via the Core Network. Compensation may flow from the service provider, to the MNO, and then to the UE/GW 116. A Core Network may be able to provide the UE/GW 116 with some indication that the flow is sponsored (i.e., that there will be no charge to the UE/GW 116) or some indication that the UE/GW 116 will be compensated for the flow and how much it will be compensated. In some embodiments, modifications to the existing IP Connectivity Access Network (IP-CAN) session modification procedure may enable these functions, as described herein.

A third party capillary network device may be referred to as a visiting "d" (d-prime) device. When a UE/GW 116 allows a visiting d' device to connect to a network, the UE/GW 116 may map traffic from the visiting d' device to an IP Address and one or more port number. The UE/GW 116 may use a single IP address for all traffic where the IP address may be shared among more than one visiting d' devices and other devices that have a relationship with the UE/GW 116. Alternatively, the UE/GW 116 may use multiple Packet Data Network (PDN) connection(s) to obtain multiple IP addresses so that traffic from visiting d' devices and/or other devices may be mapped to one or more IP address that are different from the IP address used for the traffic that belongs to the UE/GW 116 itself. One skilled in the art will recognize that the disclosed embodiments described herein for a UE/GW 116 using a single PDN connection and thus one IP Address may be applied to other embodiments where a UE/GW 116 has multiple PDN connections and multiple IP addresses.

In an embodiment, when a UE/GW 116 allows traffic from a visiting device to pass through it, the UE/GW 116 may define packet filters that define one or more port numbers that the UE/GW 116 will open for the visiting device and the QoS required on those ports. When the UE/GW 116 chooses to create new packet filters, it may request to add them to an existing bearer or it may request a new bearer. The UE/GW 116 may request an existing bearer if the new flows require the same QoS treatment as an existing bearer. The "Bearer Resource Modification" command may be used to add the filters and, optionally, adjust a guaranteed but rate (GBR). The "Bearer Resource Modification" command may indicate that this is a "modify" operation and it may include the Evolved Packet System (EPS) Bearer Identity of the bearer that needs to be modified.

The UE/GW 116 may request a new bearer if the new flows require a QoS treatment that is different from any of the existing bearers. The "Bearer Resource Modification" command may be used to request the new bearer. The "Bearer Resource Modification" command may indicate that this is an "add" operation and it may include the Link Bearer ID to indicate which PDN connection should be modified. In some embodiments, the "Bearer Resource Modification" used message may be one as defined in the 3GPP TS 24.301.

Figure 4:
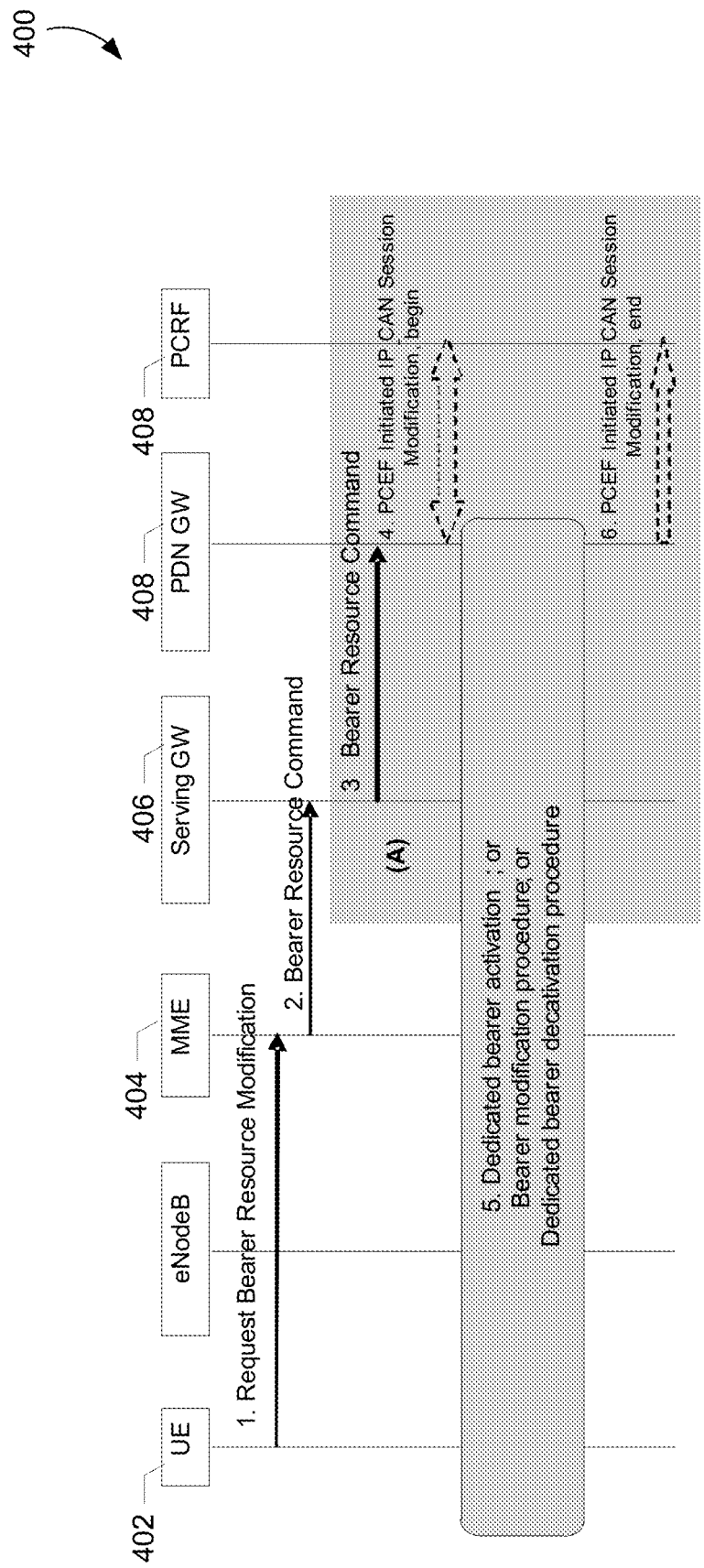
FIG. 4 is a flow diagram that illustrates exemplary, non-limiting IP-CAN Session Modification (GW (PCEF) initiated) signal flow according to an embodiment.

In an embodiment, a new field be added to the "Resource Bearer Resource Modification" message to indicate to the PCRF 408 that the UE 402 only wishes to enable the new packet filters if the flows associated with the filters will be sponsored. These flows can be on behalf of a capillary device or can be on behalf of the UE 402. The messages can also be sent by a gateway or UE acting as a gateway on behalf of itself or on behalf of a capillary device. If the PCRF 408 finds that there is no sponsor for the requested flow, the PCRF 408 will inform the PDN-GW 410 and a "Bearer Resource Failure Indication" may be sent to the UE 402 with a cause indicating that the requested flow is not sponsored. FIG. 4 is a flow diagram that illustrates exemplary, non-limiting IP-CAN Session Modification (GW (PCEF) initiated) signal flow 400 according to an embodiment. While this flow resembles the signal flow currently in use, the contents of the messages may be modified according to one or more disclosed embodiments to support sponsorship queries, indications, and other aspects of the instant subject matter as described herein.

In step 1 of FIG. 4, a "Request Bearer Resource Modification" message is sent from UE 402 to MME 404. The "Request Bearer Resource Modification" message may include the traffic flow aggregate description (TAD) information element. This information element may describe the packet filters that are being added. The TAD may include a packet filter list that describes each packet filter. Each packet filter may include a one octet "Packet Filter Identifier and Direction" field. In an embodiment, this field may be used by a UE 402 to indicate that the flow associated with this filter must be sponsored. Alternatively, this field may be used to indicate that a UE 402 requires compensation for allowing the flow. Further description of the use of this field for these purposes is set forth herein. In some embodiments, the packet filters will include the IP Address and Port Number of the service that the visiting capillary network device is trying to contact.

In step 2 of FIG. 4, a Mobility Management Entity (MME 404) may send the "Bearer Resource Command" message to a selected serving gateway (S-GW406). This message may be sent on the S11 reference point. It may include the TAD from the "Request Bearer Resource Modification" message described above, which may include the sponsorship requirement(s) for each filter.

In step 3 of FIG. 4, the S-GW 406 may send the "Bearer Resource Command" message to a selected Packet Data Network Gateway (P-GW 406), in one embodiment, via the S5 reference point. This message may include the TAD from TAD from the "Request Bearer Resource Modification" message described above, which may include the sponsorship requirements for each filter.

In step 4 of FIG. 4, the P-GW 406 may send a message that initiates or modifies the IP-CAN session. The P-GW 406 may start this process by sending the Credit Control Request (CCR) Command over the Gx interface. The CCR command message may include the TFT-Packet-Filter-Information Attribute Value Pair (AVP) for each requested packet filter. In an embodiment, this grouped AVP may be updated to include an AVP that indicates the sponsorship requirements of the flow. A description of the Sponsorship-Requirement AVP that may be used to indicate the sponsorship requirements is set forth herein. Note that in some embodiments, the PCRF 408 will check if the IP Address that the UE 402 wants to contact is associated with an Application Function (AF) (e.g., SCS) that is willing to sponsor the flow. If not, the PCRF 408 may choose to dynamically contact the AF (e.g., SCS) to check if it is willing to sponsor the flow.

The PCRF 408 may respond to the IP-CAN session modification request by sending the Credit Control Answer (CCA) Command over the Gx interface. This message includes the Charging-Rule-Install AVP for each packet filter. The Charging-Rule-Install AVP may be a grouped AVP that may include the Charging-Rule-Definition AVP. The Charging-Rule-Definition may be a grouped AVP that is updated to include an AVP that indicates the sponsorship status of the flow. The Charging-Rule-Install AVP and the Charging-Rule-Definition AVP are described in more detail herein, as is the new Sponsorship-Status AVP that may be used to indicate the sponsorship requirements.

In step 5 of FIG. 4, if the sponsorship requirements are met, the P-GW 410 may initiate the "Dedicated Bearer Activation Procedure" or the "Bearer Modification Procedure". If the sponsorship requirements are not met, the P-GW 410 may send a "Bearer Resource Modification Reject" message which will be forwarded to the UE 402. The "Bearer Resource Modification Reject" message may include an ESM_CAUSE information element that is used to indicate why the request was rejected. In an embodiment, the encoding of ESM_CAUSE may be updated so that the network may indicate to the UE 402 that the request was rejected because the requested sponsorship requirements could not be met. The updates to the ESM_CAUSE encoding are described in more detail herein.

In an embodiment, Gx messages and commands may be constructed to support the disclosed subject matter. A Credit Control Request (CCR) message may include an AVP that may be referred to as Sponsorship-Requirement. The Sponsorship-Requirement AVP may be included in the TFT-Packet-Filter-Information AVP and is described in more detail herein. A Credit Control Answer (CCA) message may include an AVP that may be referred to as Sponsorship-Status. The Sponsorship-Status AVP may be included in the Charging-Rule-Definition AVP. The Charging-Rule-Definition AVP is included inside of the Charging-Rule-Install AVP, which is also a grouped AVP. The Sponsorship-Status AVP is described in more detail herein.

The CCR message may be updated so that a sponsorship requirement may be indicated for each packet filter. The Sponsorship-Requirement may be included in the TFT-Packet-Filter-Information AVP, which is a grouped AVP that is part of the CCR message. The Sponsorship-Requirement AVP may support the following values:
NO_SPONSOR_REQUIRED 0
   Indicates that the UE 402 does not require a sponsor for this flow
SPONSOR_REQUIRED 1
   Indicates that the UE 402 requires this flow to be sponsored. Otherwise, the flow should not be allowed.
COMPENSATION_REQUIRED 2
   Indicates that the UE 402 requires compensation for allowing this flow. Otherwise, the flow should not be allowed The CCA message may be updated so that a sponsorship status may be indicated for charging rule. The Sponsorship-Status AVP may be included in the Charging-Rule-Definition AVP which is a grouped AVP that is part of the CCA message. The Sponsorship-Status AVP may support the following values:
NO_SPONSOR 0
   Indicates that the flow has no sponsor
SPONSORED_WITHOUT_COMPENSATION 1
   Indicates that the flow is sponsored, but the UE 402 will not be compensated for allowing the flow SPONSORED_WITH_COMPENSATION 2
   Indicates that the flow is sponsored and that the UE 402 will be compensated for allowing the flow In some embodiments, existing GPRS session management information elements may be updated and new GPRS session management information element may be used. Also, existing EPS session management information elements may be updated and new EPS session management information elements may be used. For example, the GPRS Session Management Traffic Flow Template information may include a packet filter list that describes all of the packet filters in the TFT. Table 2 below shows an exemplary format of a table containing data regarding when TFT's are created, added, or deleted.

TABLE 2

Exemplary Packet Filter List when the TFT operation is "create new TFT", "add packet filters to existing TFT", or "replace packet filters in existing TFT"

| 8 | 7 | 6 | 5 | 4 | 3 | 2 | 1 | |
|---|---|---|---|---|---|---|---|---|
| Sponsor Requirement | | Packet filter direction 1 | | Packet filter identifier 1 | | | | Octet 4 |
| Packet filter evaluation precedence 1 | | | | | | | | Octet 5 |
| Length of Packet filter contents 1 | | | | | | | | Octet 6 |
| Packet filter contents 1 | | | | | | | | Octet 7 |
| | | | | | | | | Octet m |
| Sponsor Requirement | | Packet filter direction 2 | | Packet filter identifier 2 | | | | Octet m + 1 |
| Packet filter evaluation precedence 2 | | | | | | | | Octet m + 2 |
| Length of Packet filter contents 2 | | | | | | | | Octet m + 3 |
| Packet filter contents 2 | | | | | | | | Octet m + 4 |
| | | | | | | | | Octet n |
| . . . | | | | | | | | Octet n + 1 |
| | | | | | | | | Octet y |
| Sponsor Requirement | | Packet filter direction N | | Packet filter identifier N | | | | Octet y + 1 |
| Packet filter evaluation precedence N | | | | | | | | Octet y + 2 |
| Length of Packet filter contents N | | | | | | | | Octet y + 3 |
| Packet filter contents N | | | | | | | | Octet y + 4 |
| | | | | | | | | Octet z |

In an embodiment, the first octet of each packet filter may indicate whether the UE/GW requires that the traffic through this filter be sponsored. Bits 8-7 of the first octet were unused spare bits that may be used to indicate the flow sponsorship requirements to the network, in one embodiment, according to the mapping below:

00: Indicates that the flow is not required to be sponsored
01: Indicates that the flow is only allowed if it is sponsored
10: Indicates that the flow is only allowed if the UE's account will be compensated for facilitating the flow
11: Unused In an embodiment, the layer 3 Session Management information element ESM cause value 0x71, which is not used currently in the standards, may be used to indicate that the sponsorship requirements of the "Bearer Resource Modification" request could not be met.

FIG. 5 shows an exemplary interface 502 that can be used with embodiments. The interface 502 can be used by a user to select which flows will request a sponsored or compensated flow. Such an interface can be part of a settings page of a mobile phone for example. In the example of FIG. 5, the interface 502 can be used to select if a third party connection is always allowed, never allowed, or allowed only if sponsored or compensated. Similarly, the interface 502 can be used to select if a high data rate connection, games, media or other connection are to be always allowed or only if sponsored or compensated. If the user selects that a certain situation requires a flow be sponsored or compensated then the methods discussed above can be used.

Figure 6A:
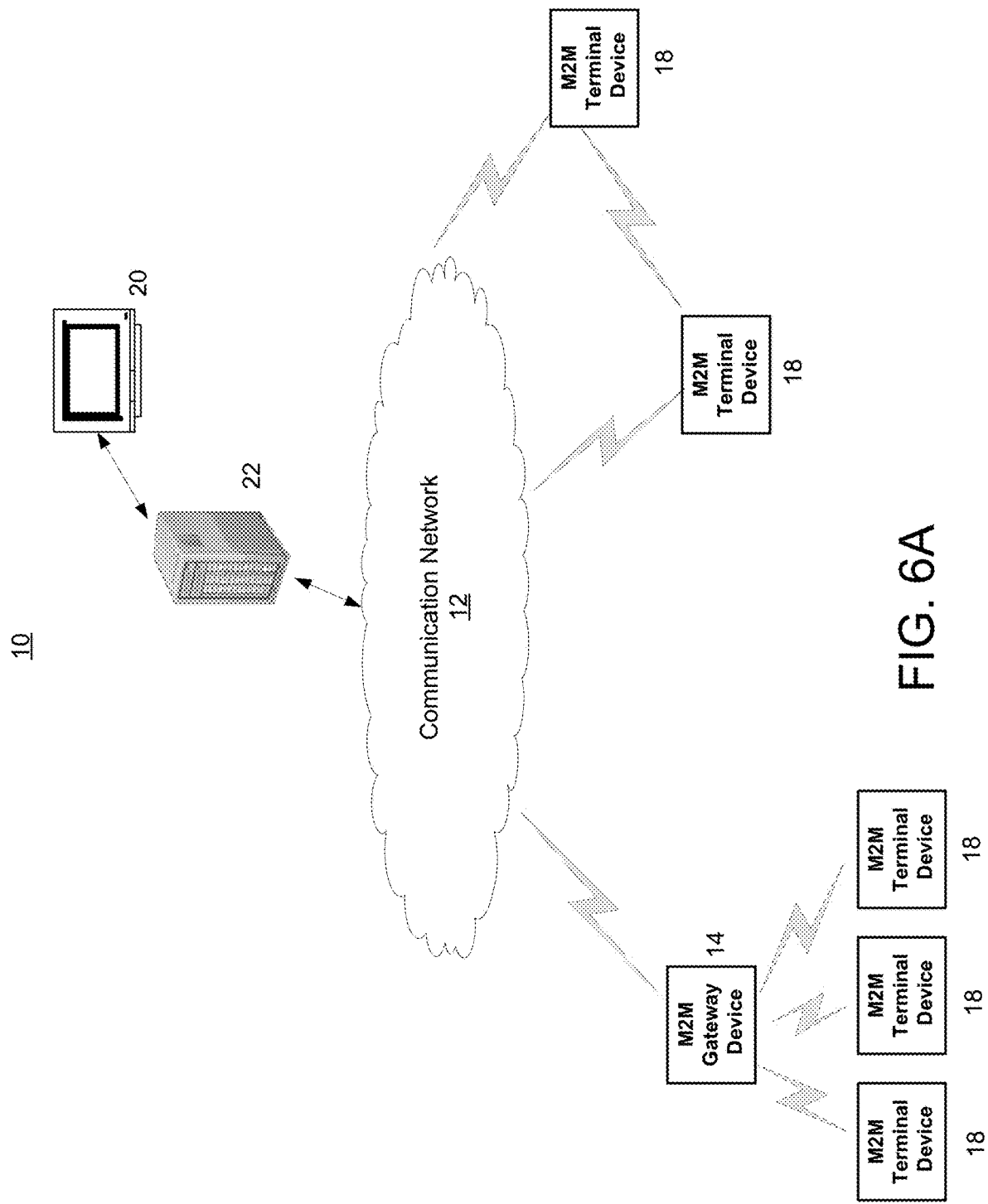
FIG. 6A is a system diagram of an example machine-to-machine (M2M) or Internet of Things (IoT) communication system in which one or more disclosed embodiments may be implemented.

FIG. 6A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc. Communication system 10 can be used to implement functionality of the disclosed embodiments and can include capillary device charging functionality and logical entities such as the UE/GW 116, P-GW 118, PCRF 104, service layer entities, application server entities and logic to produce the user interface of FIG. 5.

As shown in FIG. 6A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 6A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g. PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 6B:
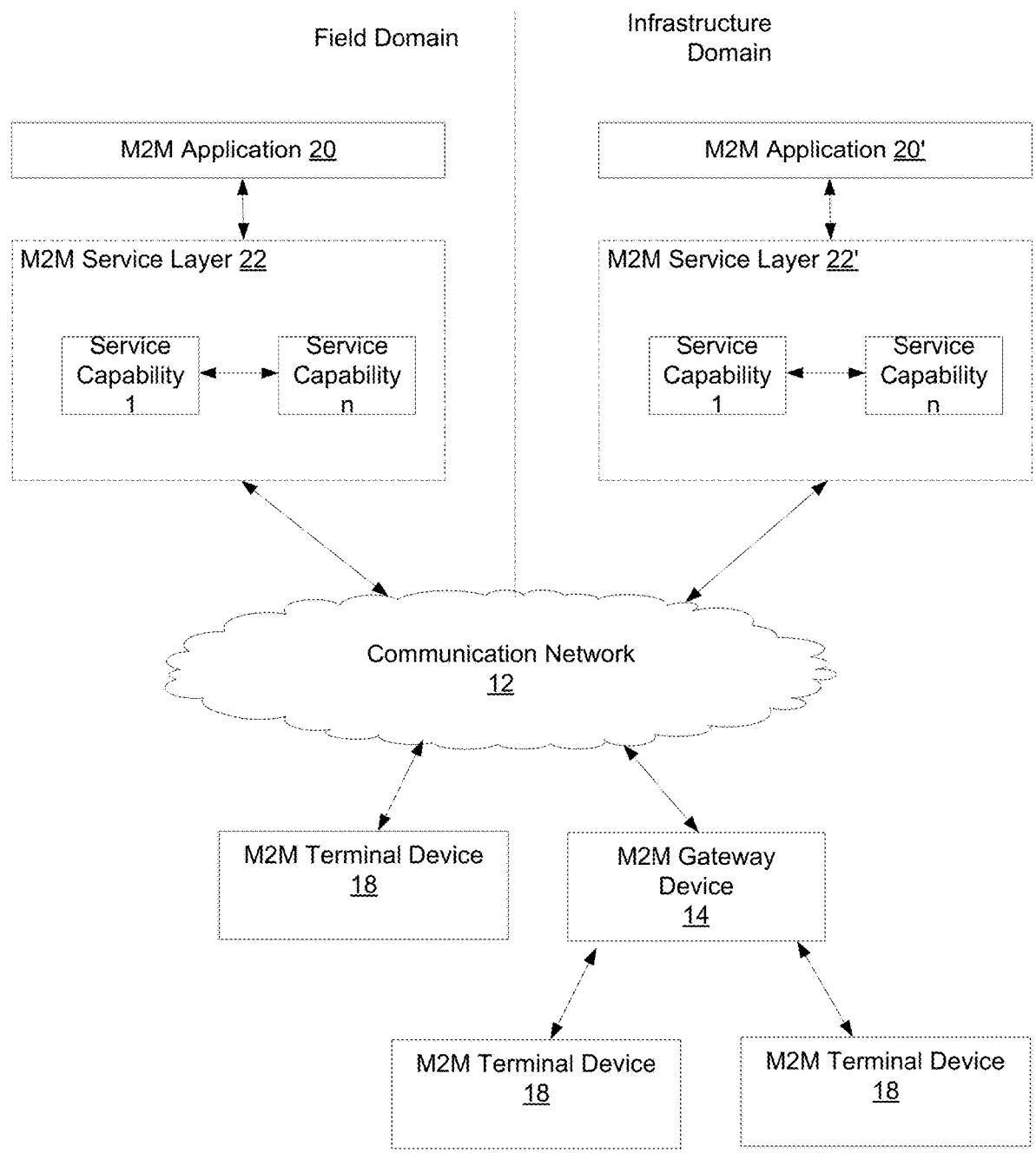
FIG. 6B is a system diagram of an example architecture that may be used within the M2M/IoT communications system illustrated in FIG. 6A.

Referring to FIG. 6B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include capillary device charging functionality and logical entities such as the UE/GW 116, P-GW 118, PCRF 104, service layer entities, application server entities and logic to produce the user interface of FIG. 5.

It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc. Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g. cloud/compute/storage farms, etc.) or the like.

Referring also to FIG. 6B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide. The connection methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may include the applications that interact with capillary devices and therefore may be used in conjunction with the disclosed systems and methods for capillary device charging. The M2M applications 20 and 20' may include the applications that interact with the UE or gateway and may also be used in conjunction with other disclosed charging systems and methods. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Logical entities of the present application may be implemented as part of the service layer 22 and 22'. The service layer can be a software middleware layer that supports value-added service capabilities through a set of Application Programming Interfaces (APIs) and underlying networking interfaces. The service layer can be implemented as a logical entity on one or more devices with a processor and memory as disclosed in FIGS. 6C and 6D. Both ETSI M2M and oneM2M use a service layer that may contain the logical entities of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, the logical entities of the present application can implemented as part of an M2M network that uses a Service Oriented Architecture (SOA) and/or a resource-oriented architecture (ROA) to access services of the present application.

Figure 6C:
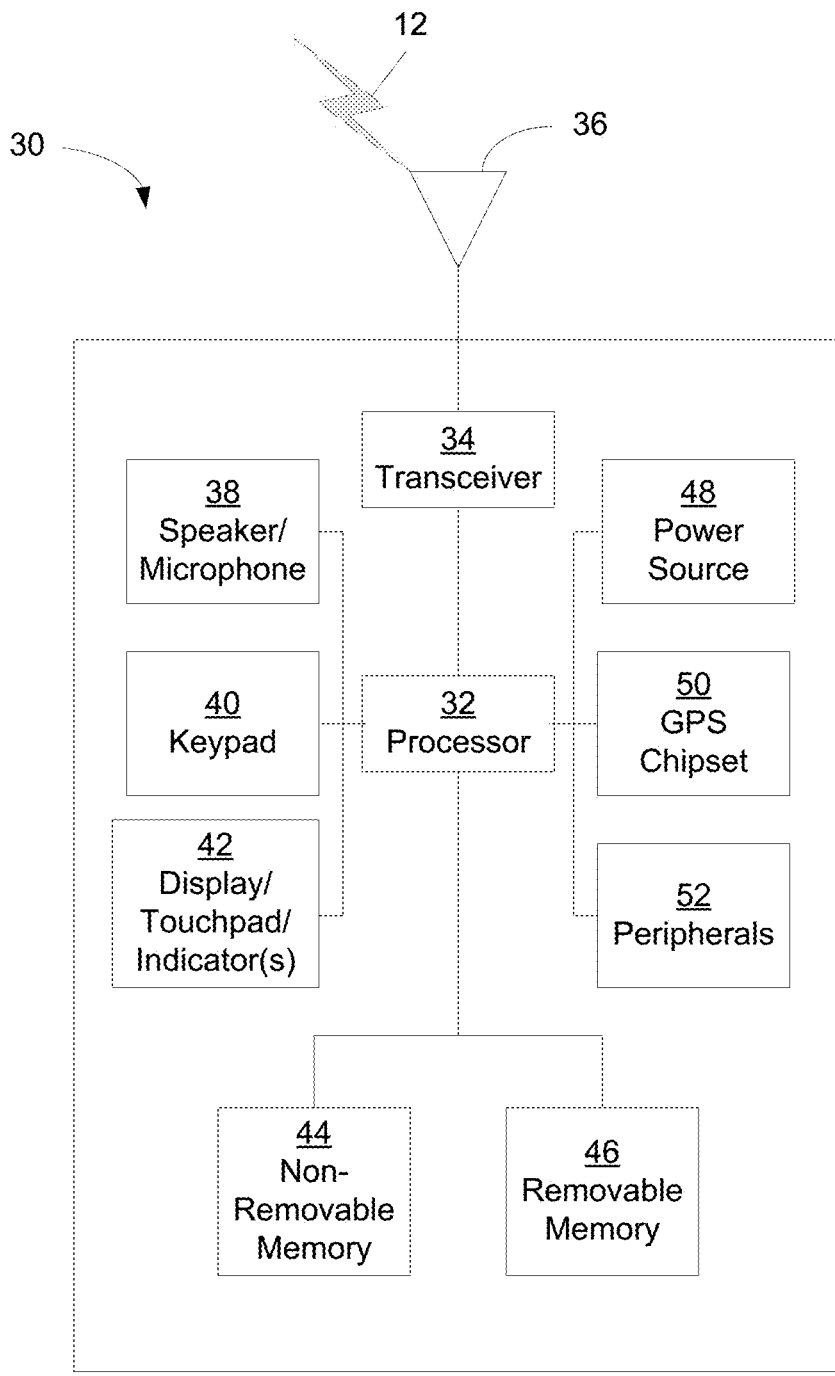
FIG. 6C is a system diagram of an example M2M/IoT terminal or gateway device that may be used within the communications system illustrated in FIG. 6A.

FIG. 6C is a system diagram of an example device 30, that can be an M2M device, user equipment, gateway, UE/GW or any other nodes including nodes of the mobile care network, service layer network application provider, terminal device 18 or an M2M gateway device 14 for example. The device 30 can execute or include logical entities such as the UE/GW 116, P-GW 118, PCRF 104, service layer entities, application server entities and logic to produce the user interface of FIG. 5.

The device 30 can be part of an M2M network as shown in FIG. 6A-B or part of a non-M2M network. As shown in FIG. 6C, the device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. It will be appreciated that the device 30 may include any sub-combination of the foregoing elements while remaining consistent with an embodiment. This device may be a device that uses and/or implements the disclosed systems and methods for capillary device charging or other disclosed charging systems and methods.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the device 30 to operate in a wireless environment. The processor 32 may be coupled to the transceiver 34, which may be coupled to the transmit/receive element 36. While FIG. 6C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, and/or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 6C as a single element, the device 30 may include any number of transmit/receive elements 36. More specifically, the device 30 may employ MIMO technology. Thus, in an embodiment, the device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the device 30 may have multi-mode capabilities. Thus, the transceiver 34 may include multiple transceivers for enabling device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the device 30, such as on a server or a home computer.

The processor 30 may receive power from the power source 48, and may be configured to distribute and/or control the power to the other components in the device 30. The power source 48 may be any suitable device for powering the device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the device 30. It will be appreciated that the device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 6D:
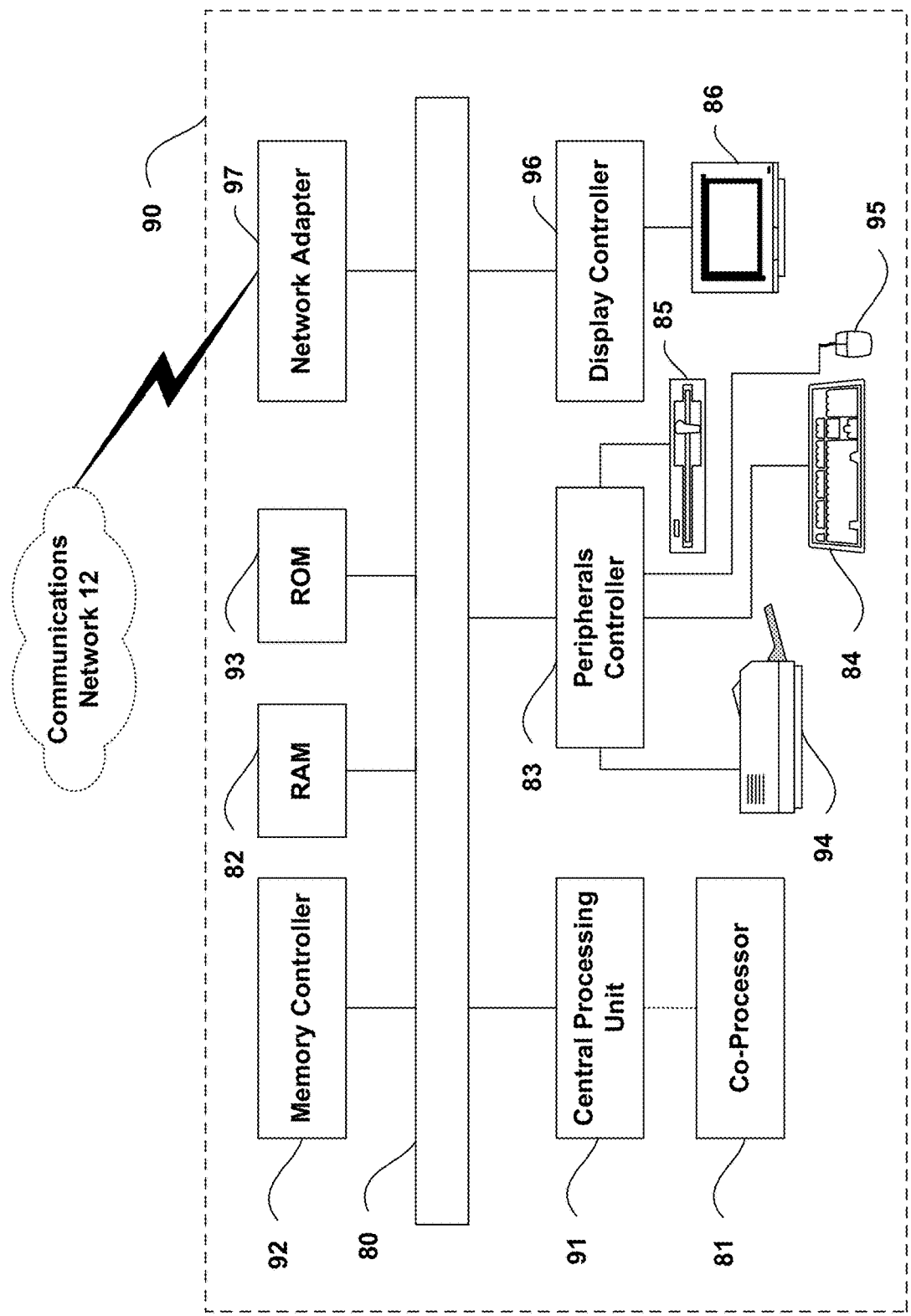
FIG. 6D is a block diagram of an example computing system in which aspects of the communication system of FIG. 6A may be embodied.

FIG. 6D is a block diagram of an exemplary computing system 90 on which, for example, the M2M service platform 22 of FIGS. 6A and 6B may be implemented. Computing system 90 may comprise a computer or server and may be controlled primarily by computer readable instructions, which may be in the form of software, wherever, or by whatever means such software is stored or accessed. Computing system 90 can execute or include logical entities such as the UE/GW 116, P-GW 118, PCRF 104, service layer entities, application server entities and logic to produce the user interface of FIG. 5. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process the data used in various embodiments of the disclosed systems and methods for capillary device charging or other disclosed charging systems and methods.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 6A and 6B. In an embodiment, network adaptor 97 may receive and transmit data used by various disclosed systems and methods for capillary device charging or other disclosed charging systems and methods.

It is understood that any or all of the systems, methods, and processes described herein may be embodied in the form of computer executable instructions (i.e., program code) stored on a computer-readable storage medium. Such instructions, when executed by a machine, such as a computer, server, M2M terminal device, M2M gateway device, or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as the UE/GW 116, P-GW 118, PCRF 104, service layer entities, application server entities and logic to produce the user interface of FIG. 5 may be embodied in the form of the computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

In describing preferred embodiments of the subject matter of the present disclosure, as illustrated in the FIGs., specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wireless transmit/receive unit (WTRU) comprising a processor and a memory, the memory storing computer-executable instructions that, when executed by the processor, cause the WTRU to perform the following:

transmitting, to a network, a message requesting to modify or establish a non-cellular flow for another WTRU on a condition that modifying or establishing the non-cellular flow is charged to the other WTRU and is not charged to the WTRU;

receiving, based on the message request, an indication from the network that the non-cellular flow will be charged to the other WTRU and not charged to the WTRU; and modifying or establishing the non-cellular flow based on the received indication from the network.

2. The WTRU of claim 1, wherein the user WTRU acts as a gateway for a capillary device.

3. The WTRU of claim 1, wherein the requested flow is added to an existing PDN connection.

4. The WTRU of claim 3, wherein the message request indicates an adjustment to a guaranteed bit rate (GBR) of the existing PDN connection.

5. The WTRU of claim 1, wherein the message request includes a traffic flow aggregate description (TAD) information element describing the flow.

6. The WTRU of claim 1, wherein the message request is a Resource Bearer Modification message.

7. The WTRU of claim 1, wherein the modifying or establishing the non-cellular flow is associated with a bearer supporting traffic with the other WTRU.

8. A network device comprising a processor and a memory, the memory storing computer-executable instructions that, when executed by the processor, cause the network device to perform the following:

receiving, from a wireless transmit/receive unit (WTRU), a message requesting to modify or establish a non-cellular flow for another WTRU on a condition that modifying or establishing the non-cellular flow is to be charged to the other WTRU and is not charged to the WTRU; and transmitting, based on the message request to the WTRU, an indication the non-cellular flow will be charged to other WTRU and not to the WTRU.

9. The network device of claim 8, wherein the WTRU acts as a gateway for a capillary device.

10. The network device of claim 8, wherein the requested flow is added to an existing PDN connection.

11. The network device of claim 10, wherein the message request indicates an adjustment to a guaranteed bit rate (GBR) of the existing PDN connection.

12. The network device of claim 8, wherein the message request includes a traffic flow aggregate description (TAD) information element describing the flow.

13. The network device of claim 8, wherein the message request is a Resource Bearer Modification message.

14. The network device of claim 8, wherein the modifying or establishing the non-cellular flow is associated with a bearer supporting traffic with the other WTRU.

15. A method comprising:
transmitting, to a network, a message requesting to modify or establish a non-cellular flow for another WTRU on a condition that modifying or establishing the non-cellular flow is charged to the other WTRU and is not charged to the WTRU;
receiving, based on the message request, an indication from the network that the non-cellular flow will be charged to the other WTRU and not charged to the WTRU; and
modifying or establishing the non-cellular flow based on the received indication from the network.

16. The method of claim 15, wherein the WTRU acts as a gateway for a capillary device.

17. The method of claim 15, wherein the requested flow is added to an existing PDN connection.

18. The method of claim 17, wherein the message request indicates an adjustment to a guaranteed bit rate (GBR) of the existing PDN connection.

19. The method of claim 15, wherein the message request includes a traffic flow aggregate description (TAD) information element describing the flow.

20. The method of claim 15, wherein the modifying or establishing the non-cellular flow is associated with a bearer supporting traffic with the other WTRU.

* * * * *